United States Patent
Andrews

(10) Patent No.: US 7,024,185 B2
(45) Date of Patent: Apr. 4, 2006

(54) METHOD AND SYSTEM FOR OPERATING A FIELD PROGRAMMABLE LINE CARD USING A COUNTRY CODED TEMPLATE

(75) Inventor: Jeffrey S. Andrews, Norcross, GA (US)

(73) Assignee: Arris International, Inc., Suwanee, GA (US)

( * ) Notice: Subject to any disclaimer, the term of this patent is extended or adjusted under 35 U.S.C. 154(b) by 426 days.

(21) Appl. No.: 10/272,414

(22) Filed: Oct. 15, 2002

(65) Prior Publication Data

US 2003/0073458 A1    Apr. 17, 2003

Related U.S. Application Data

(60) Provisional application No. 60/329,347, filed on Oct. 15, 2001.

(51) Int. Cl.
*H04M 3/00* (2006.01)

(52) U.S. Cl. ............. 455/419; 455/418; 379/399.1
(58) Field of Classification Search ........... 455/414.2, 455/414.1, 418, 419, 432.3
See application file for complete search history.

(56) References Cited

U.S. PATENT DOCUMENTS

| | | | | |
|---|---|---|---|---|
| 5,828,959 | A | * | 10/1998 | Soderbacka .......... 455/445 |
| 5,862,481 | A | * | 1/1999 | Kulkarni et al. ...... 455/432.2 |
| 5,999,811 | A | * | 12/1999 | Molne .............. 455/432.3 |
| 6,516,193 | B1 | * | 2/2003 | Salmela et al. ...... 455/432.3 |
| 6,643,511 | B1 | * | 11/2003 | Rune et al. .......... 455/433 |
| 2004/0077359 | A1 | * | 4/2004 | Bernas et al. ........ 455/456.1 |

* cited by examiner

*Primary Examiner*—Joseph Feild
*Assistant Examiner*—S. Smith
(74) *Attorney, Agent, or Firm*—John L. Doughty

(57) ABSTRACT

A method and system for using a database that associates a specific set of line interface specifications to a specific design requirement. The design requirement may correspond to a particular country's telephony operating requirements, or one of multiple sets of operating requirements within a country. This allows loading of generic line interface data at manufacturing. Specific criteria can be provided to the line interface at installation and/or startup.

The database contains the specifications for all potential operating requirements, and a template code, sent to a line interface device from a central controller, is used to determine the corresponding set of line interface specifications from the database, which is indexed on template code.

2 Claims, 2 Drawing Sheets

METHOD AND SYSTEM FOR OPERATING A FIELD PROGRAMMABLE LINE CARD USING A COUNTRY CODED TEMPLATE

CROSS REFERENCE TO RELATED APPLICATION

This application claims the benefit of priority under 35 U.S.C. 119(e) to the filing date of Walston, et al., U.S. provisional patent application No. 60/329,347 entitled "Field Programmable Linecard Country Template", which was filed Oct. 15, 2001, and is incorporated herein by reference.

FIELD OF THE INVENTION

This invention relates, generally, to communication networks and, more particularly, a line card or more generally, a line interface, used in communications networks that is field-programmable for use in different countries having different requirements for their telephony line interfaces.

BACKGROUND

Currently, broadband networks may be used to provide traditional telephony service over community antenna television ("CATV") or other communications networks using coaxial cable ("coax") or optical fiber cable. For example, ARRIS™ International, Inc. offers a telephony over cable product known as Cornerstone™, which incorporates linecards that provide an interface for connecting subscriber lines to the Cornerstone™ product, and hence, the rest of the network. Products, such as those in the Cornerstone™ line, may typically be used in more than one country.

However, different countries may have different network design specifications and/or operating requirements. For example, telephony networks in Germany typically require a ringing frequency of 25 Hz, whereas networks in neighboring France and Austria typically require a ringing frequency of 50 Hz. Thus, equipment to be used in different countries has to be configured for the network-operating environment in which it will be used. Accordingly, equipment hardware is often configured at the manufacturing plant or before installation, and custom software is shipped for a particular network's requirements.

Although configuring the line cards or, more generally, line interfaces before installation is acceptable from a technical performance standpoint alone, the cost of the telephony equipment is higher because of the customized nature of the manufacturing and shipping processes. In addition, for some network operators that may serve multiple countries, costs and inconvenience are increased because equipment configured for one country may not work in another country, and thus extra equipment must be ordered and stored. If an operator desires to have extra equipment in stock for network expansion and/or maintenance purposes, and the operator has a network in France and another in Germany, for example, twice as much hardware would have to bought and stored, or at the least, different software versions would have to be maintained and managed for the two different countries.

Therefore, there is a need for a method and system for manufacturing and operating network equipment that can be integrated into a variety of different countries without the need to manufacture the equipment differently for use in different countries.

Furthermore, there is a need for a method and system for easily configuring broadband network equipment that provides telephony service in different countries after the equipment has been installed in a network.

SUMMARY

It is an object to provide a method and system for remotely accessing and configuring a telephony line interface to provide those network characteristics required by a particular country's network design specifications by utilizing a template that relates a specific setting with those more detailed settings required to configure the line interface to the desired characteristics.

It is another object to provide a network interface unit with a universal telephony line interface equipment that can utilize a template code based on a user input to configure itself for operation in a specific country.

A database comprising a unique identifier for each of a plurality of countries is provided. The database is indexed by a unique identifier and each identifier is associated with one of a plurality of different template codes corresponding to a plurality sets of network operating criteria, such that each country's network design specifications may be represented by a single set of operating criteria. However, some countries may have more than one set of operating specifications. Accordingly, multiple sets of operating specifications may exist in the database for a given country.

The country code can be made available to a network interface unit comprising the local controller and the telephony line interface in multiple ways. A field technician could enter a country code into the telephony equipment with a user interface. The interface may be manufactured as part of the telephony line interface, or may be a handheld, or similar, device that can be temporarily connected to the NIU during setup of the telephony service.

More usefully, the central controller of the telephony system that controls the network interface units and the line interfaces, can be provisioned either on a system basis, or on a line-by-line basis with the desired country codes. The controlling system can then communicate the desired template code to the line interface independent of human intervention at the time of service activation. This reduces the equipment and training needed for the operator. Operating specification parameters that do not vary with respect to country may be loaded during manufacture or at initial bootup, and are typically not included in the country-code template database.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein, no card type, fiber or cable type, integrated circuit, connector, enclosure, power supply, operating system, or circuit board arrangement, for example, is required to be used in the practicing of the present invention. Indeed, selection of such parts and components would be within the routine functions of a designer skilled in the art.

Figure 1:
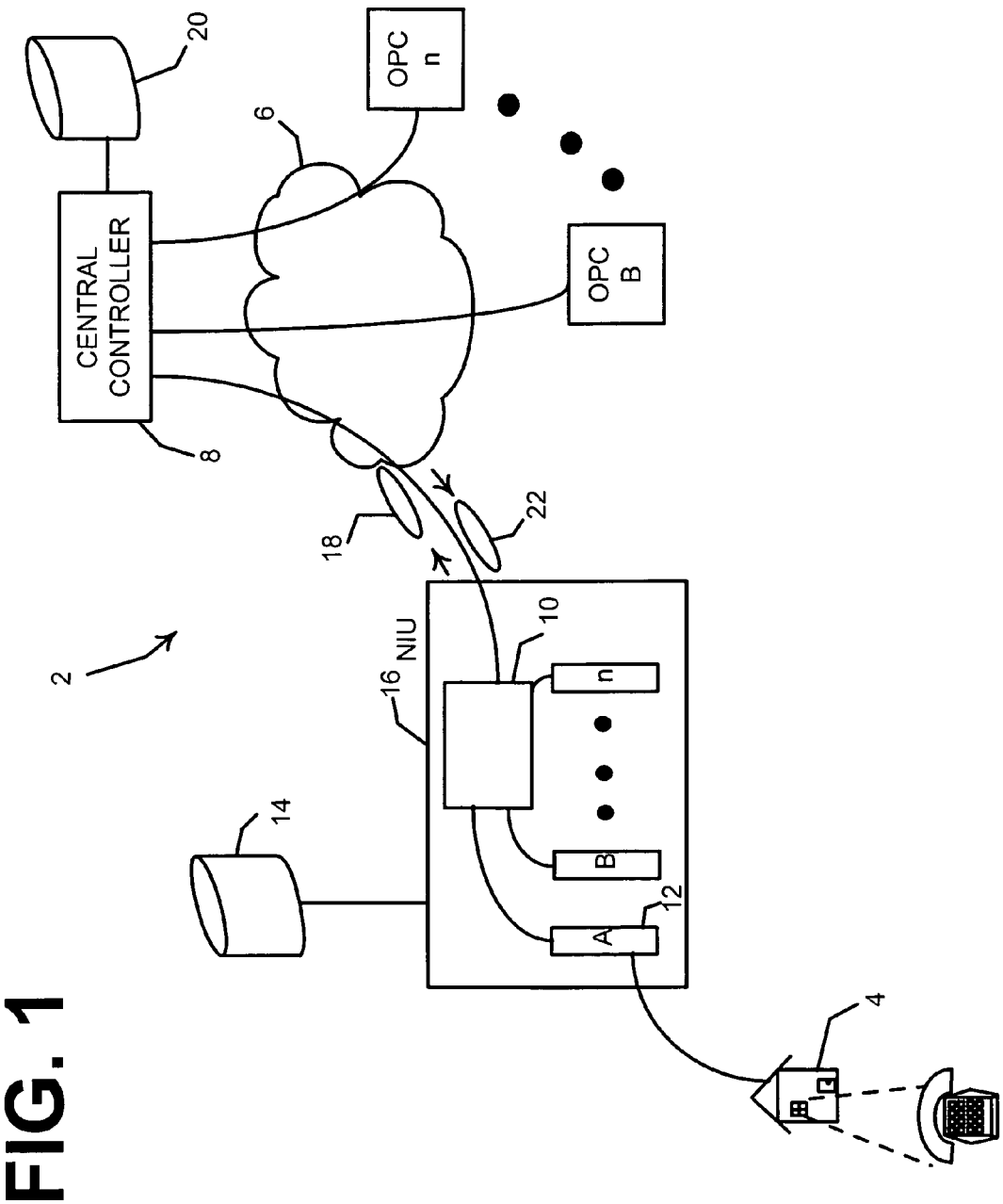
FIG. 1 illustrates a network architecture for implementing the invention.

Turning now to the figures, FIG. 1 illustrates a system 2 for providing telephony services to a plurality of subscribers 4 using a broadband communications network 6. A central controller ("CC") 8, such as a Host Digital Terminal or Packet Cable provisioning server, manages and controls the services provided to the subscribers 4. The CC may manage services for an area that may be as large as an entire large metropolitan area, but often manages a smaller area.

Network 6 may use Ethernet technology, as well as other transport technologies known in the art, to provide high bandwidth transport functionality. Network 6 may comprise a hybrid network infrastructure known in the art as hybrid fiber coax ("HFC") that partly uses optical fiber and partly uses coaxial cable, such as typically used in community antenna television systems ("CATV"), to provide the transport medium of network. The operating technology may include proprietary protocols or standards-based protocols such as DOCSIS.

Within the hierarchy of network system 2, a plurality of NIUs 16 facilitates the providing of telephony services to the subscribers 4 of the provider/operator of CC 8. It will be appreciated by those skilled in the art that each NIU 16 shown may comprise more than one layer in the hierarchy, such as hubs and nodes. However, for clarity, these components have been represented as a single block in the figure. Each hub or node may have its own operations controller, for controlling data traffic flow by and between the various components that make up the network. Thus, when referring to NIU 16 (of which there will typically be a plurality in any given network, each serving a plurality of subscribers), it will be appreciated that many components are being referenced.

An individual network interface unit 16 typically exists for each subscriber 4. That unit 16 may be designed with a single telephony interface, or more commonly with multiple line interfaces. Regardless of the physical configuration, each telephony line of subscriber 4 typically connects to a dedicated port, with each port capable of being configured for a unique address.

Since the telephony systems of different countries typically have different telephony line interface requirements, a particular line interface 12, or group of line interfaces, served by a given NIU 16, for example, should be programmed according to the network in which it will be operating. Instead of customizing a particular line interface 12, or group of line interfaces, during manufacture, for a particular country, design specifications, or register values, corresponding to the telephony line interface requirements for all countries may be stored in database 14. Database 14 may be included on each line interface 12 during manufacturing, or may be included as part of the network interface equipment 16 that comprises the plurality of line interfaces 12, and other hardware, such as a microprocessor 10 and power supply, for example. At NIU 16, database 14 may be shared by a group of line interfaces 12, or may be individually loaded on each line interface. Accordingly, a particular NIU 16 can send a request message 18 for line interface 12, or group of line interfaces served by a particular NIU, to the CC 8 requesting that line interface register values be refreshed with current values. Reasons for this request could include: initial installation, recovery from power cycle, etc.

Information is typically provided to the CC 8 associating a particular template code with a line interface during startup of network 2, or assignment of a new line interface for a new service request. The CC 8 determines the applicable line interface or interfaces for which the requested template information in request message 18 applies. The template code corresponding to applicable line interface 12 is retrieved from template code cross-reference database 20 and sent back to the requesting NIU 16. The values retrieved from template code cross-reference database 20 may be included in message 22 sent back by the CC 8 to the requesting NIU 16.

The network interface unit 16 uses the information received in message 22 to retrieve a set of line interface register values that corresponds to the template code. A plurality of register value sets is stored in database 14, which is indexed by template code. Thus, the network interface unit 16 can retrieve the appropriate set of register values to use based on the code received in message 22. Accordingly, a technician does not have to manually provision each line interface upon startup, thereby reducing the man-hours and possibility of errors at startup.

Figure 2:
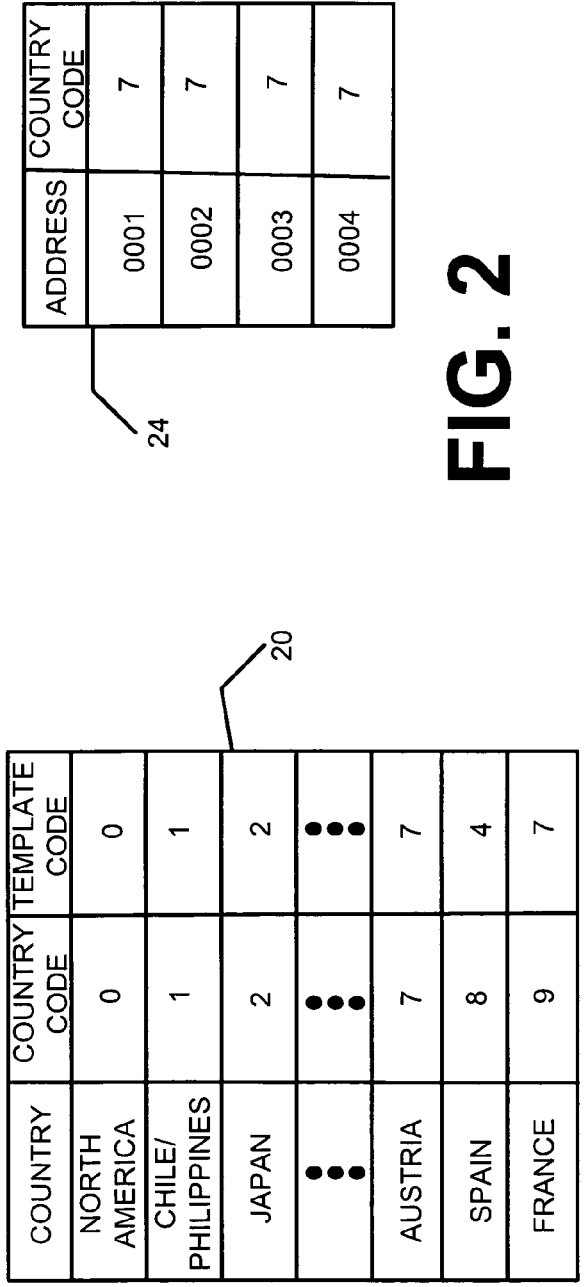
FIG. 2 illustrates specification database, template code cross-reference database, and a country code/address database.

Turning now to FIG. 2, the databases that may be used to implement an aspect are illustrated. Template code cross-reference database 20 shows that, in addition to merely using a country code to determine the appropriate set of register values to be used for a particular line interface 12 (shown in FIG. 1), a given number of country codes may correspond to the same or lesser number of actual template codes. This is because the standards of more than one country may use the same set of line interface values to implement networks. Also, within a given country there may be multiple acceptable line interface values. For example, for seamless telephony service between Canada and the United States, both may use an identical set of register values. As shown in template code cross-reference database 20, Austria and France, while each having unique country codes, share the same template code. This is because both countries use the same criteria, or line interface requirements to operate telephony networks. It will be appreciated that the databases shown in the figure are for purposes of example, and that a typical template code cross-reference database 20 will comprise more than just nine different country codes and, similarly with respect to specification database 14, will comprise more than just seven template codes. Furthermore, the array of various register values corresponding to the different template codes is given for purposes of example, and is not meant to indicate, or otherwise limit, the actual types of parameters or corresponding register values that may be used in a given system.

Thus, for example, a line interface or NIU may be configured with the information as shown in specification database 14. If a CC receives an information request, the CC can determine from which address the request was received by looking up in a database similar to country code/address cross-reference database 24, which associates a specific line interface address with a country code. Then, based on the country code determined from country code/address cross-reference database 24, the appropriate template code from template code cross-reference database 20 can be determined and sent back to the requesting line interface, or NIU. As an example based on FIG. 2, if a information request is received from a line interface having address "0001", the CC could determine country code "7" from country code/address cross-reference database 24, and in turn, determine from template code cross-reference database 20 that template code "7" should be returned to the requesting entity. The requesting entity, whether a sole line interface, or an NIU serving multiple line interfaces, can configure the line interface using the specifications taken from the specification database 14 that correspond to the returned template code.

What is claimed is:

1. A method for programming a line interface means configured with a plurality of sets of line interface specification values in a communications network providing telephony services, wherein each one of a plurality of disparate country codes has been associated with one of a plurality of distinct sets of line interface specification values comprising:

receiving a request message from one of a plurality network devices, each of which is associated with a unique address;

determining a country code that corresponds to the unique address;

determining one of a plurality of template codes that corresponds to the country code, each template code corresponding to one of the distinct sets of interface reference register values;

returning the template code that was determined to correspond to the country code, and hence the unique address of the requesting device;

determining a desired set of line interface specification values to provision the requesting device with based on the returned template code; and provisioning the line interface device with the desired set of line interface specification values that correspond to the returned template code.

2. The method of claim 1 wherein the request message is received using a first message signal sent to a central authority and the returned template code is returned using a second message signal from the central authority.

* * * * *